US011329706B2

(12) United States Patent
Ballantyne et al.

(10) Patent No.: US 11,329,706 B2
(45) Date of Patent: May 10, 2022

(54) COMMUNICATION SCANNING METHOD AND SYSTEM

(71) Applicant: Intel Corporation, Santa Clara, CA (US)

(72) Inventors: Wayne Ballantyne, Chandler, AZ (US); Gregory Chance, Chandler, AZ (US); Bruce Geren, Chandler, AZ (US); Dror Markovich, Tel Aviv (IL); Peter Pawliuk, Tempe, AZ (US); Nebil Tanzi, Hoffman Estates, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/054,256

(22) PCT Filed: Sep. 28, 2018

(86) PCT No.: PCT/US2018/053493
§ 371 (c)(1),
(2) Date: Nov. 10, 2020

(87) PCT Pub. No.: WO2020/068125
PCT Pub. Date: Apr. 2, 2020

(65) Prior Publication Data
US 2021/0234596 A1     Jul. 29, 2021

(51) Int. Cl.
*H04B 7/06*     (2006.01)
*H04B 17/318*     (2015.01)
(Continued)

(52) U.S. Cl.
CPC ......... *H04B 7/0632* (2013.01); *H04B 7/0617* (2013.01); *H04B 7/0634* (2013.01);
(Continued)

(58) Field of Classification Search
CPC .. H04B 7/0632; H04B 7/0617; H04B 7/0634; H04B 7/0695; H04B 17/318;
(Continued)

(56) References Cited

U.S. PATENT DOCUMENTS

| | | | |
|---|---|---|---|
| 2008/0075021 A1* | 3/2008 | Rofougaran | H04B 7/0669 370/277 |
| 2009/0189801 A1* | 7/2009 | Forstner | G01S 7/032 342/175 |
| 2014/0132450 A1 | 5/2014 | Chen et al. | |

OTHER PUBLICATIONS

International Search Authority, PCT Search Report issued for PCT/US2018/053493, 2 pgs., dated Nov. 26, 2018.

* cited by examiner

*Primary Examiner* — Minh Trang T Nguyen
(74) *Attorney, Agent, or Firm* — Banner & Witcoff Ltd.

(57) ABSTRACT

In a communication device and corresponding methods, a hierarchical, reduced power, beam search process includes a hierarchical activation of the radio frequency frontend (RFFE), transceiver, and baseband integrated circuit (BBIC) for a beam searching operations. For example, a first signal metric measurements can be performed to determine signal information. An operating mode can be determined based on the signal information. In a first operating mode, one or more second signal metric measurements can be performed for a subset of beamforming configurations of the wireless communication device to determine beamforming information. In a second operating mode, one or more third signal metric measurements can be performed on the beamforming configurations to determine the beamforming information.

25 Claims, 6 Drawing Sheets

(51) Int. Cl.
*H04B 17/336* (2015.01)
*H04W 56/00* (2009.01)

(52) U.S. Cl.
CPC ......... *H04B 7/0695* (2013.01); *H04B 17/318* (2015.01); *H04B 17/336* (2015.01); *H04W 56/001* (2013.01)

(58) Field of Classification Search
CPC . H04B 17/336; H04B 7/0686; H04W 56/001; Y02D 30/70
See application file for complete search history.

COMMUNICATION SCANNING METHOD AND SYSTEM

BACKGROUND

Field

Aspects described herein generally relate to communication scanning methods and systems, including using hierarchical scanning operations to reduce scanning time and/or scanning resources.

Related Art

Wireless communications are expanding into communications having increased data rates (e.g., from Institute of Electrical and Electronics Engineers (IEEE) 802.11a/g to IEEE 802.11n to IEEE 802.11ac and beyond). Currently, in fifth generation (5G) "New Radio" cellular communication and millimeter wave (mmWave) spectrum (e.g., 24 GHz-300 GHz), and in WiGig (IEEE 802.11ad and/or IEEE 802.11ay), beam-forming and beam acquisition are being used for wireless communication devices.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

Figure 1:
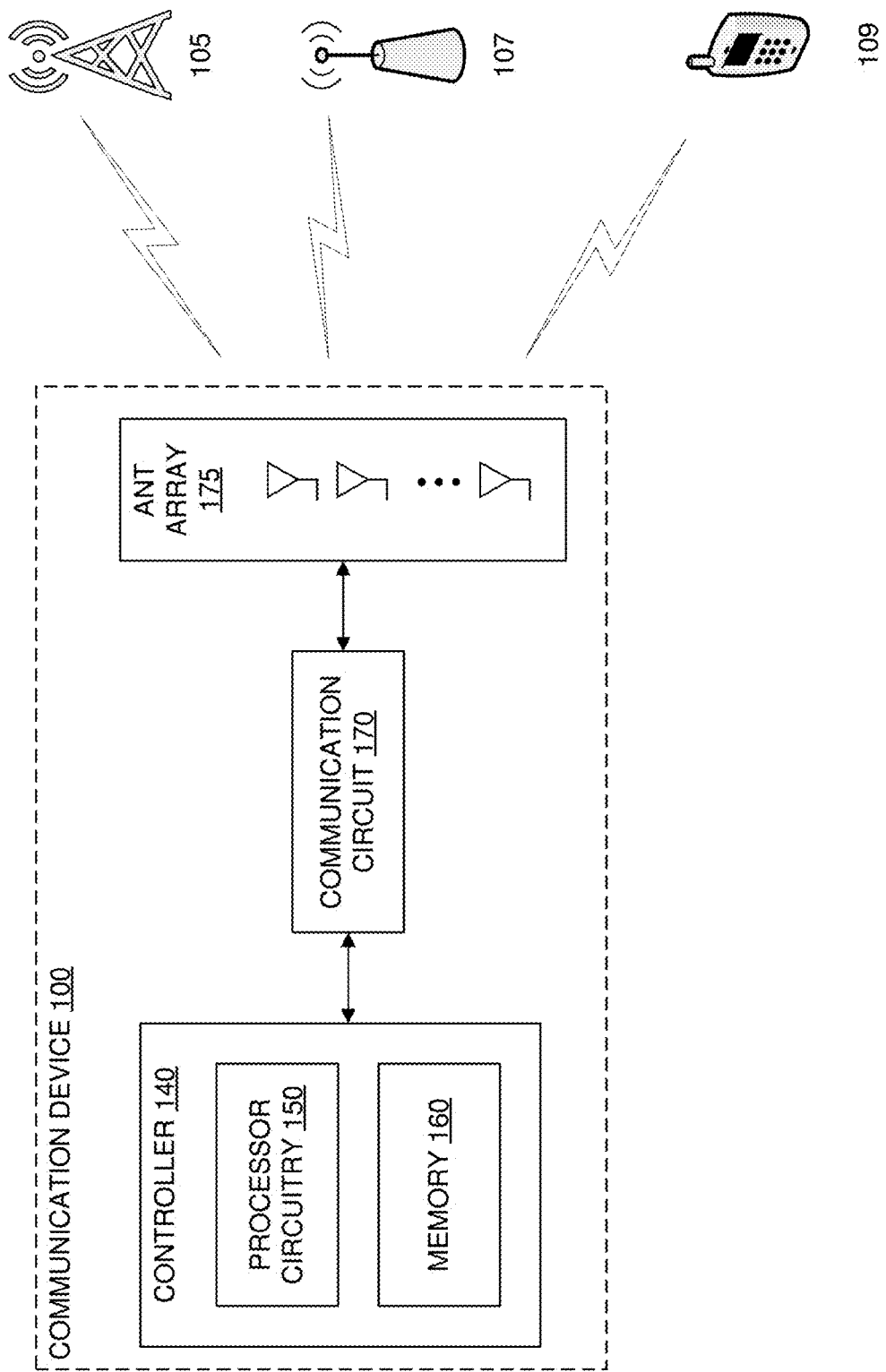
FIG. 1 illustrates a communication device according to an exemplary aspect of the present disclosure.

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Aspects of the present disclosure relate to one or more systems, devices, apparatus, assemblies, methods, and/or computer readable media configured to enhance wireless communications, including communication systems and methods using antenna beam scanning methods using phased array antennas.

Phased array communication systems can include an array of antennas to steer the transmit signal in particular direction. The directional control is achieved by phase shifting the signal to each antenna so that in a certain direction, the transmitted signals add coherently or constructively. In other directions, the transmitted signals add destructively, and the radiated power in those directions is reduced or eliminated. In this way, the radiated energy can be focused and directionally controlled towards the target (e.g., a receiver).

In a similar way, received signals from each antenna are phase shifted such that the signals add constructively when received from one direction, and the signals add destructively or non-coherently when received from another direction. It is the combination of the phase shift incurred by the difference in path delay between antennas and the phase shift introduced by the phase shifters that determine whether a signal in a particular direction is constructively or destructively added. In this operation, the directionality of the antenna can be adjusted by changing the phase delay introduced by each phase shifter. The phased array antenna system can be configured as a directional antenna in which the directivity of the antenna can be electronically altered or controlled.

As an overview, communication systems and methods according to the present disclosure include the controlling of beamforming scanning/searching for multi-antenna systems such as systems with phased array antennas. In operation, beamforming scanning is performed to determine appropriate antennas of a multi-antenna antenna module to use for wireless communications that utilize beamforming.

Beam scanning is time-consuming and costs significant energy and processing resources by the baseband integrated circuit (BBIC). Generally, both the transceiver and baseband integrated circuit are in active receive mode during the beam search process, as the BBIC needs to decode synchronization or reference signals.

In operation, the BBIC searches for each transmitted synchronization signal block (SSB) by adjusting the radio frequency (RF) front end beam angle and attempts to synchronize to each one, if there is sufficient signal detected. This synchronization process consumes significant baseband energy, especially if the user equipment (UE) is near the cell edge where coherent energy will only be detected if the UE and base station (gNB) beams are aligned. Otherwise, the signal-to-noise ratio (SNR) will be inadequate for synchronization. In that case, the UE must also keep adjusting its receive beam to eventually align with the gNB.

The BBIC power consumption for beam acquisition is significant, estimated to be equal or higher than that of the combination of the transceiver and RF Front End (RFFE). Aspects herein provide a reduced power beam search method and system to improve the operation and power consumption of conventional systems. In an exemplary aspect, a hierarchical, reduced power, beam search method involves a hierarchical activation of the RFFE, transceiver, and BBIC for a beam searching operation. For example, the beam searching operations can include: (a) the RFFE having broadband power detectors, (b) the RFFE and transceiver (without using the BBIC), and (c) a verification and synchronization of the beams discovered in (a) and (b) by the BBIC in conjunction with the RFFE and transceiver. This hierarchical approach provides, in order, lowest power and lowest sensitivity to highest power and highest sensitivity.

Advantageously, because the RFFE only and RFFE & transceiver scans filter out antenna beam angles that do not produce signals with significant energy, the BBIC will only have to decode the most promising signals. As a result, the power consumption of the system is reduced as well as provides faster beam acquisitions compared to when the BBIC is involved in the scan/synchronization data decode of every possible beam.

Further, during a background scan, when no systems are available, the BBIC will not be woken up at all, thus reducing overall BBIC loading and allowing the BBIC to remain in lower power mode for longer intervals.

FIG. 1 illustrates a communication device 100 according to an exemplary aspect of the present disclosure. The communication device 100 is configured to transmit and/or receive wireless communications via one or more wireless technologies. For example, the communication device 100 can be configured for wireless communications conforming to, for example, one or more fifth generation (5G) cellular communication protocols, such as 3GPP New Radio (NR) protocols that use, for example, the 28 or 39 GHz frequency spectrum, and/or millimeter wave (mmWave) spectrum communications (e.g., 24 GHz-300 GHz), such as WiGig (IEEE 802.11ad and/or IEEE 802.11ay) which operates at 60 GHz. The communication device 100 is not limited to these communication protocols and can be configured for one or more additional or alternative communication protocols, such as one or more 3rd Generation Partnership Project's (3GPP) 3G or 4G protocols (e.g., Long-Term Evolution (LTE)), one or more wireless local area networking (WLAN) communication protocols, and/or one or more other communication protocols as would be understood by one of ordinary skill in the relevant arts. The communication device 100 can be configured to communicate with one or more other communication devices, including, for example, one or more base stations 105, one or more access points (AP) 107, one or more other communication devices 109, and/or one or more other devices as would be understood by one of ordinary skill in the relevant arts.

The communication device 100 can include a controller 140 communicatively coupled to a communication circuit 170.

The communication circuit 170 can be configured to transmit and/or receive wireless communications using one or more wireless technologies via antenna array 175. In an exemplary aspect, the communication circuit 170 includes processor circuitry that is configured for transmitting and/or receiving wireless communications conforming to one or more wireless protocols. For example, the communication circuit 170 include a transmitter and a receiver configured for transmitting and receiving wireless communications, respectively, via one or more antenna units, such as antenna array 175. In aspects where the communication device 100 includes two or more communication circuit 170, the two or more communication circuits 170 can have their own antenna unit, or can share a common antenna unit via a duplexer or diplexer.

The antenna unit can include one or more antenna elements forming an integer array of antenna elements. In an exemplary aspect, the antenna unit is a phased array antenna that includes multiple radiating elements (antenna elements) each having a corresponding phase shifter (See FIGS. 2 and 3). With the antenna unit configured as a phased array antenna, the communication circuit 170 can be configured to perform one or more beamforming operations that include shifting the phase of the phase shifters to steer the antenna elements in the desired direction. In an exemplary aspect, the communication circuit 170 is configured to perform one or more beamforming scanning operations, including shifting the phase of the antenna elements in a phased array.

Returning to FIG. 1, the controller 140 can include processor circuitry 150 that is configured to control the overall operation of the communication device 100, such as the operation of the communication circuit 170. The processor circuitry 150 can be configured to control the transmitting and/or receiving of wireless communications via the communication circuit 170. In an exemplary aspect, the processor circuitry 150 is configured to control the communication circuit 170 to control one or more beamforming scanning operations.

The processor circuitry 150 can also be configured to perform one or more wireless modem processing functions (e.g., media access control (MAC), encoding/decoding, modulation/demodulation, data symbol mapping; error correction, etc.). The processor circuitry 150 can also be configured to run one or more applications and/or operating systems; power management (e.g., battery control and monitoring); display settings; volume control; and/or user interactions via one or more user interfaces (e.g., keyboard, touchscreen display, microphone, speaker, etc.).

The controller 140 can further include a memory 160 that stores data and/or instructions, where when the instructions are executed by the processor circuitry 150, controls the processor circuitry 150 to perform the functions described herein. The memory 160 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 160 can be non-removable or removable, or a combination of both.

Examples of the communication device 100 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the communication device 100 may be a stationary communication device, including, for example, a stationary computing device—such as a personal computer (PC), a desktop computer, a computerized kiosk, and an automotive/aeronautical/maritime in-dash computer terminal.

In one or more aspects, the communication device 100 or one or more components of the communication device 100 (e.g. communication circuit 170) can be additionally or alternatively configured to perform digital signal processing (e.g., using a digital signal processor (DSP)), modulation and/or demodulation (using a modulator/demodulator), a digital-to-analog conversion (DAC) and/or an analog-to-digital conversion (ADC) (using a respective DA and AD converter), an encoding/decoding (e.g., using encoders/decoders having convolution, tail-biting convolution, turbo, Viterbi, and/or Low Density Parity Check (LDPC) encoder/decoder functionality), frequency conversion (using, for example, mixers, local oscillators, and filters), Fast-Fourier Transform (FFT), preceding, and/or constellation mapping/de-mapping to transmit and/or receive wireless communications conforming to one or more wireless protocols and/or facilitate the beamforming scanning operations and/or beamforming communication operations.

Figure 2:
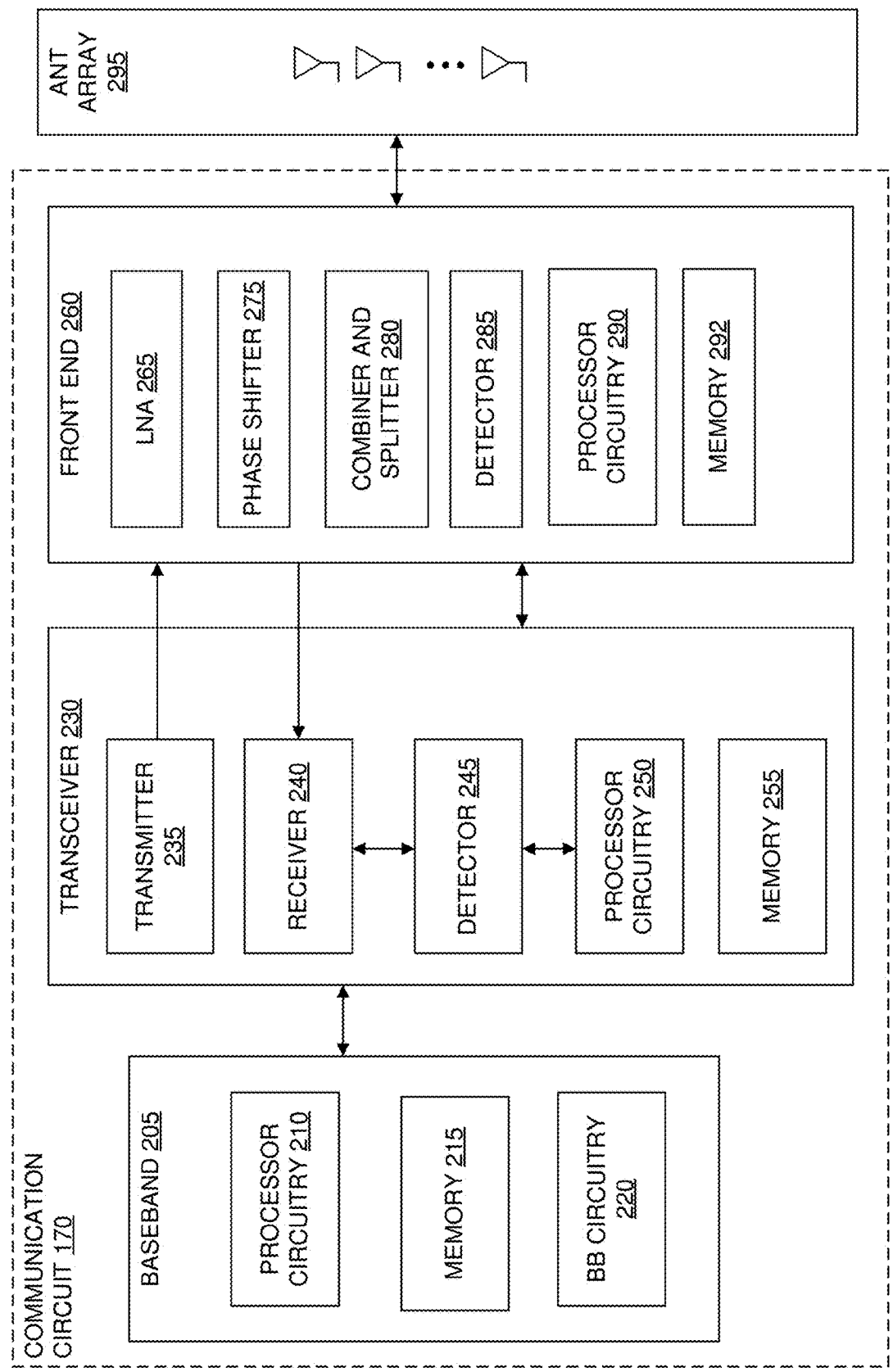
FIG. 2 illustrates a communication circuit according to an exemplary aspect of the present disclosure.

FIG. 2 illustrates an exemplary aspect of the communication circuit 170 according to present disclosure. In an exemplary aspect, the communication circuit 170 includes a baseband circuit 205, transceiver 230, a radio frequency front end (RFFE) 260, and an antenna array 295. The baseband circuit 205 can be a baseband integrated circuit (BBIC) in one or more aspects. In an exemplary aspect, one or more of the baseband circuit 205, transceiver 230, a radio frequency front end (RFFE) 260, and an antenna array 295 include one or more circuits, one or more processors, and/or logic that are configured to perform the functions of the respective components.

In an exemplary aspect, the baseband circuit 205 is communicative coupled to the transceiver 230, which is communicatively coupled to the RFFE 260, which is communicative coupled to the antenna array 295, thereby forming a communication chain.

In an exemplary aspect, the antenna array 295 includes two or more antenna elements forming an integer array of antenna elements. In this example, the antenna array is configured as a phased array antenna that includes multiple radiating elements (antenna elements). The radiating elements can be respectively paired with a corresponding phase shifter and a corresponding LNA of the RFFE 260. Alternatively, two or more of the radiating elements can be paired with a phase shifter and LNA of the RFFE 260. The antenna array 295 can be an aspect of the antenna array 175.

During wireless reception, wireless RF signals are received by RFFE 260 via the antenna array 295. Conversely, during transmission, RF signals are transmitted by the RFFE 260 via the antenna array 295.

Figure 3:
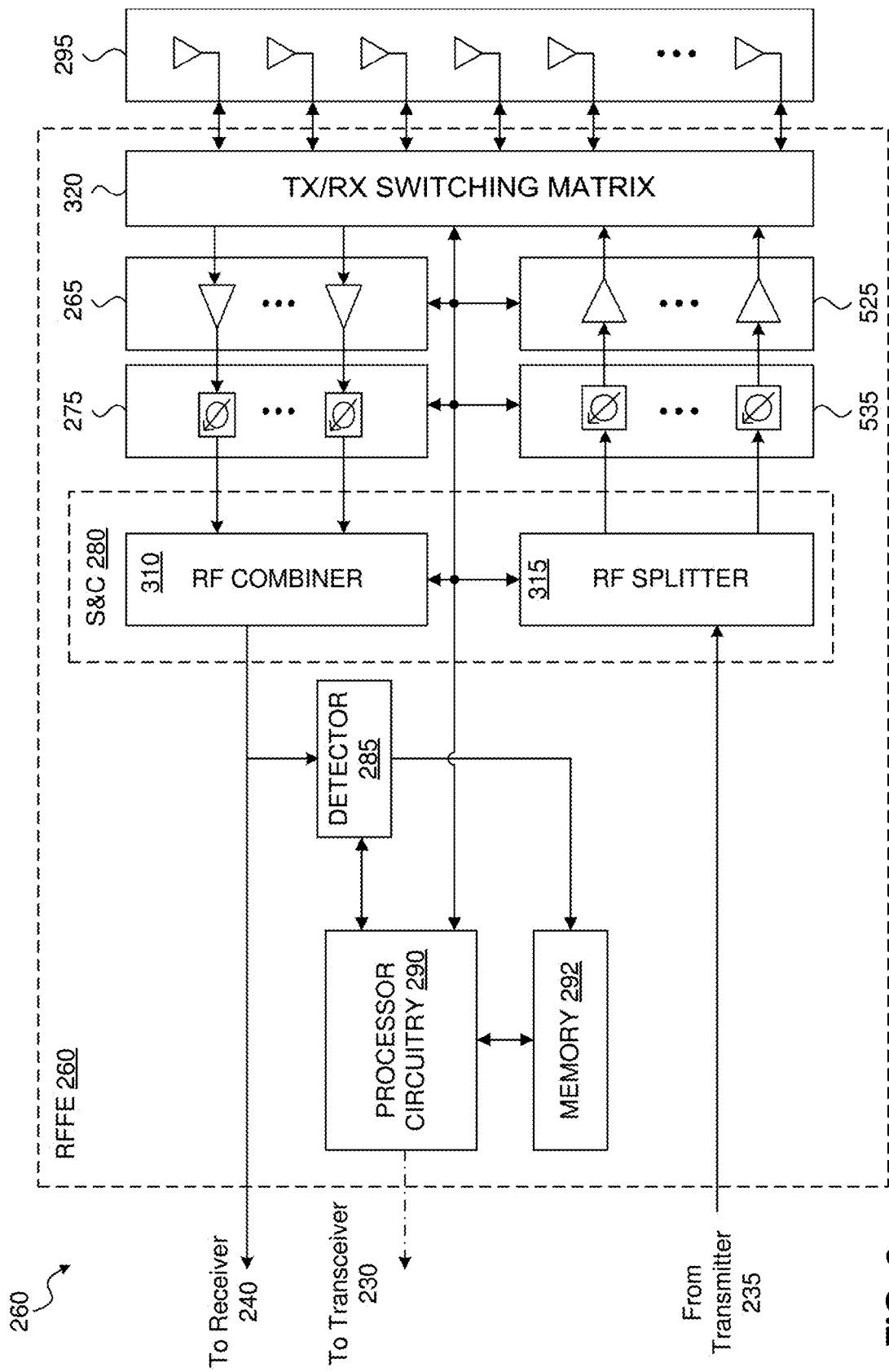
FIG. 3 illustrates a radio frequency frontend (RFFE) according to an exemplary aspect of the present disclosure.

In an exemplary aspect, and with reference to FIGS. 2 and 3, the RFFE 260 includes one or more low-noise amplifiers (LNAs) 265, one or more phase shifters 275, a combiner and splitter 280, a detector 285, processor circuitry 290, and memory 292. In an exemplary aspect, and with reference to FIGS. 2 and 3, a signal received via elements of the antenna array 295 are amplified by respective LNAs 265 and the amplified signals are provided to a respective phase shifter 275 that generated corresponding phased shifted signals. The phase shifted signals are then combined by RF combiner 310 of the splitter & combiner 280. The combined signal is then provided to the receiver 240 of the transceiver 230. In an exemplary aspect, the RFFE 260 is configured to process RF signals received via the antenna array 295. The processing can include, for example, converting the RF signals to corresponding intermediate frequency (IF) signals. During transmission, the RFFE 260 can process signals received from the transceiver 230 and transmit the signals via the antenna array 295. The processing can include converting IF signals to RF signals.

In an exemplary aspect, the detector 285 is configured to detect one or more signal metrics of the combined RF signal generated by the combiner & splitter 280. In operation, as shown in FIGS. 2 and 3, the detector 285 detects signal metric(s) and generates a corresponding signal metric value. The detector 285 can provide the signal metric value to the memory 292 and the value is stored in the memory 292, and/or can provide the signal metric value to the processor circuitry 290, which can perform one or more processing operations on the signal metric value and then provide the processed information to the memory 292. The signal metric value determined by the detector 285 can be referred to as signal information in one or more aspects. In an exemplary aspect, the detector 285 is a power detector but its capabilities are not limited to detection of power. In this example, the detector 285 can be configured to measure a signal envelope power to detect the power. In an exemplary aspect, the detector is a voltage detector configured to detect a voltage. In this example, the detected voltage can correspond to a signal power.

In an exemplary aspect, the signal metric is a signal power metric (e.g. signal-to-noise ratio (SNR), received signal strength indicator (RSSI), and/or one or more other signal power metrics as would be understood by one or ordinary skill in the art. The signal metric is not limited to a signal power metric and can additionally or alternatively include one or more other signal characteristics as would be understood by one of ordinary skill in the art, such as (but not limited to) frequency, center frequency, bandwidth, signal degradation, or the like.

In an exemplary aspect, the processor circuitry 290 is configured to control the operation of the RFFE 260, such as the operation of the LNAs 265, phase shifters 275, combiner and splitter 280, detector 285, and memory 292.

In an exemplary aspect, the processor circuitry 290 is configured to control the RFFE 260 perform a beam scanning operation (e.g. sweep of antenna weight vectors (AWVs)) by adjusting the phase of the phase shifters 275 and/or the gain of the LNAs 265, and control the detector 285 to detect the signal metrics of a received signal for each of the AWVs. The antenna weight vectors (AWVs) correspond to phase shifter data values and/or gain values of the LNAs. The processor circuitry 290 can also provide the detected signal metrics to the transceiver 230 and BBIC 205. These operations can collectively referred to as a RFFE-only scanning mode. In an exemplary aspect, the processor circuity 290 is a fixed function or multifunction hardware (HW) state machine.

In an exemplary aspect, for an RFFE-only scanning mode, digital portions in the RFFE 260 can include a low power CPU (e.g. processor circuitry 290) and/or (HW) state machine for offloading tasks from the transceiver 230 for power reduction by allowing the transceiver 230 to remain in a low-power state and by reducing the number of transactions between the RFFE 260 and transceiver 230.

In an exemplary aspect, the RFFE 260 is configured to perform beam scanning operations cooperatively with the transceiver 230. In this example, the RFFE 260 can provide detected and/or processed metrics to the transceiver 230, which can perform one or more beam forming operation based on the detected and/or processed metrics provide by the RFFE 260 and/or based on one or more signal metrics detected by detector 245 of the transceiver 230. The beam scanning operations performed by the transceiver 230 are discussed in detail below. Although FIG. 2 shows the detector 245 coupled to the receiver 240 and processor circuitry 250, the coupling/connections are not limited thereto. In other aspects, additional or alternative couplings/connections between two or more of the components of the transceiver 230 can be used as would be understood by one of ordinary skill in the art.

In an exemplary aspect, the transceiver 230 is configured to transmit and/or receive wireless communications via one or more wireless technologies. The transceiver 230 can include a transmitter 235 and a receiver 240 configured for transmitting and receiving wireless communications, respectively, via the RFFE 260 and antenna array 295.

In an exemplary aspect, the transceiver 230 further includes a detector 245, processor circuitry 250, and memory 255. In an exemplary aspect, a signal received the RFFE 260 is provided to the receiver 240. Signals to be transmitted are provided by the transmitter 235 to the RFFE, 260.

In an exemplary aspect, the transceiver 230 is configured to process RF (and/or IF) signals from the RFFE 260. The processing can include, for example, converting the received signals to their corresponding baseband in-phase (I) and quadrature (Q) signal components, digital signal processing, analog-to-digital conversion (ADC), digital filtering, Automatic gain control (AGC), phase and amplitude correction, and DC offset correction.

In an exemplary aspect, the detector 245 is configured to detect one or more signal metrics of the baseband signals generated by the receiver 240. In operation, the detector 245 detects signal metric(s) and generates a corresponding signal metric value based on the signal provided to the receiver 240 from the RFFE 260 and/or the signal metric value (signal information) provided from the RFFE 260. The detector 245 can provide the signal metric value to the memory 255 and the value is stored in the memory 255, and/or can provide the signal metric value to the processor circuitry 250, which can perform one or more processing operations on the signal metric value and then provide the processed information to the memory 255. The signal metric value generated by the detector 245 can be referred to as beamforming information in one or more aspects.

In an exemplary aspect, the signal metric is a signal power metric (e.g. signal-to-noise ratio (SNR), received signal strength indicator (RSSI), and/or one or more other signal power metrics as would be understood by one or ordinary skill in the art. The signal metric is not limited to a signal power metric and can additionally or alternatively include one or more other signal characteristics as would be understood by one of ordinary skill in the art, such as (but not limited to) frequency, center frequency, bandwidth, signal degradation, or the like.

In an exemplary aspect, the processor circuitry 250 is configured to control the operation of the transceiver 230, such as the operation of the transmitter 235, receiver 240, detector 245, and memory 255.

In an exemplary aspect, the processor circuitry 250 is configured to control the transceiver 230 to control the detector 245 to detect the signal metrics of a received signal from the RFFE 260. The processor circuitry 250 can also provide the detected signal metrics to the RFFE 260 and/or BBIC 205. In an exemplary aspect, the transceiver 230 is configured to perform a beam scanning operation cooperatively with the RFFE 260, which can be referred to as a RFFE-Transceiver scanning mode. In an exemplary aspect, the transceiver 230 is configured to perform a beam scanning operation cooperatively with the RFFE 260 and the BBIC 205, which can be referred to as a RFFE-Transceiver-BBIC scanning mode. In an exemplary aspect, the beamforming scanning operations performed by the BBIC 205 and transceiver 230, in cooperation with the RFFE 260 has increased sensitivity and narrow-band discrimination compared to the beamforming scanning operations performed solely by the RFFE 260. In an exemplary aspect, in the RFFE-Transceiver-BBIC scanning mode, the BBIC 205 is configured to control the transceiver 230 and RFFE 260 to perform the beamforming scanning operations.

In an exemplary aspect, the BBIC 205 is configured to perform one or more baseband processing operations on signals received from the transceiver 230 and/or on signals to be provided to the transceiver 230 for subsequent transmission. The baseband processing operations can include, for example, digital signal processing, modulation and/or demodulation, digital-to-analog conversion (DAC) and/or an analog-to-digital conversion (ADC), an encoding/decoding (e.g., using encoders/decoders having convolution, binary Reed-Solomon (RS), RS, tail-biting convolution, turbo, Viterbi, and/or Low Density Parity Check (LDPC) encoder/decoder functionality), frequency conversion (using, for example, mixers, local oscillators, and filters), Fast-Fourier Transform (FFT), precoding, and/or constellation mapping/de-mapping.

In an exemplary aspect, the baseband processing operation(s) are based on the signal metric values (signal information) from the RFFE 260 and/or based on the signal metric values (beamforming information) from the transceiver 230.

In an exemplary aspect, the BBIC 205 is configured to decode one or more synchronization signal blocks (SSBs) of the wireless communication signal based on the signal metric values (signal information) from the RFFE 260 and/or based on the signal metric values (beamforming information) from the transceiver 230.

In an exemplary aspect, the BBIC 205 includes processor circuitry 210, memory 215 and baseband (BB) circuitry 220.

In an exemplary aspect, the processor circuitry 210 is configured to control the overall operation of the BBIC 205, such as the operation of the BB circuitry 220. In an exemplary aspect, the processor circuitry 210 is additionally or alternatively configured to control the overall operation of the transceiver 230 and/or the RFFE 260. The processor circuitry 210 can be configured to perform one or more baseband processes and/or beamforming scanning operations, and/or to control the BB circuitry 220 to perform one or more beamforming scanning operations. The beamforming scanning operations can include, for example, controlling the phase of one or more of the phase shifters 275, the gain of one or more of the LNAs 265, processing of one or more primary synchronization signals (PSS) and/or secondary synchronization signals (SSS), one or more decoding/encoding operations (e.g. Binary RS decoding), or the like.

The BBIC 205 can receive I/Q data from the transceiver 230, signal metric values (signal information) from the RFFE 260, and/or signal metric values (e.g. beamforming information) from the transceiver 230. The received information/data can be stored in memory 215 and/or processed by the processor circuity 210 and/or BB circuitry 220.

Figure 4:
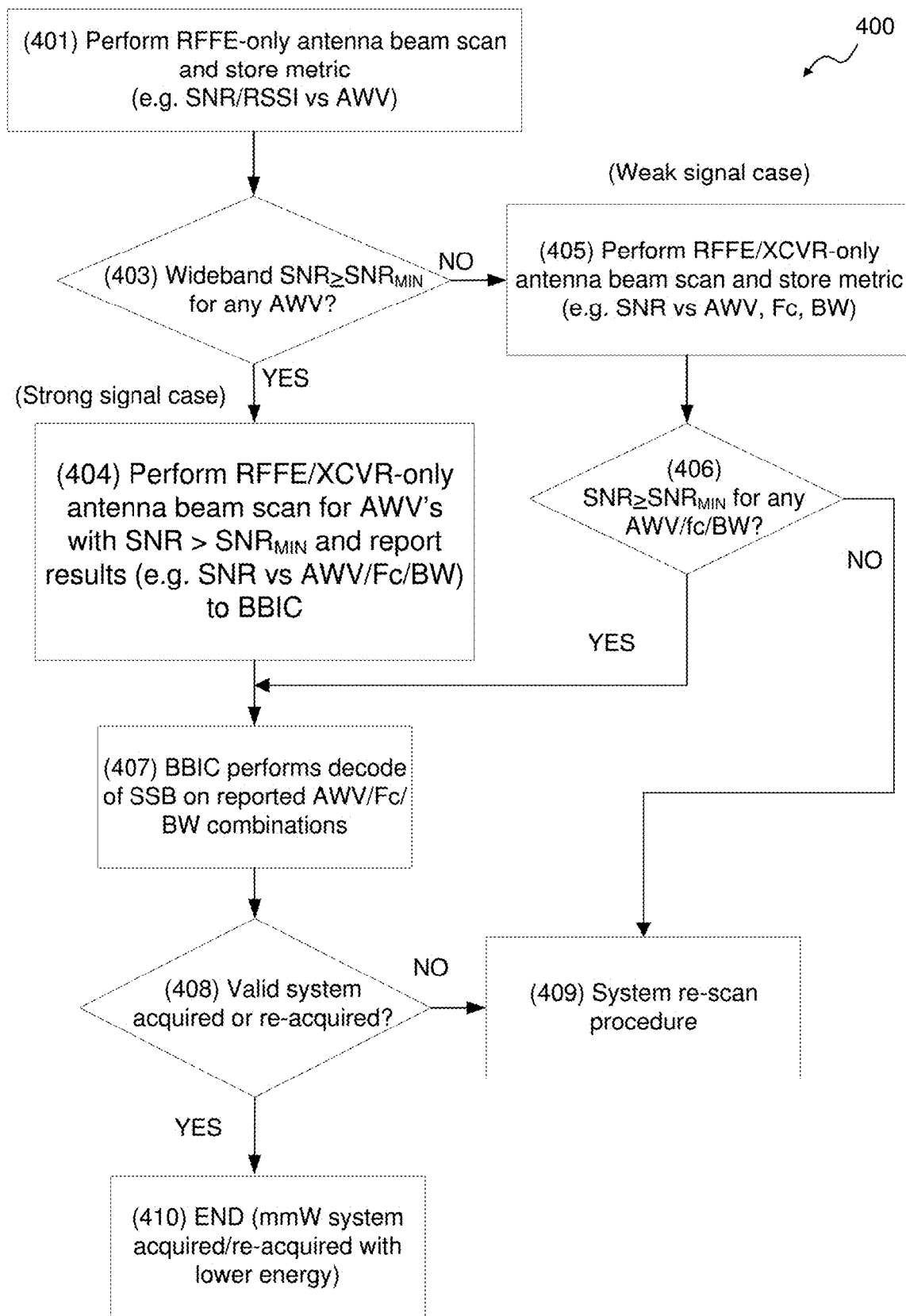
FIG. 4 illustrates a scanning method according to an exemplary aspect of the present disclosure.

FIG. 4 illustrates a flowchart of scanning method 400 according to an exemplary aspect of the present disclosure is illustrated. The flowchart is described with continued reference to FIGS. 1-3. The operations of the method are not limited to the order described below, and the various operations may be performed in a different order. Further, two or more operations of the method may be performed simultaneously with each other.

The method of method 400 begins at operation 401, where one or more first signal metric measurements are performed by the RFFE 260 to determine signal information. In an exemplary aspect, the RFFE, 260 autonomously searches through various antenna beam angles by adjusting different phase shifter data values and LNA gain values (e.g. AWVs). The detector 285 detects a signal metric values (e.g. signal information) for each of the different phase and/or gain settings. In an exemplary aspect, the processor circuitry 290 is configured to adjust (or control the respective components to adjust) the phase and/or gain settings, and to determine the signal metric values based on the various settings.

In an exemplary aspect, the RFFE 260 performs the signal metric measurements without involvement (or with only limited involvement) of the transceiver 230 and BBIC 205. In this example, the transceiver 203 and/or BBIC 205 may remain in a low-powered operating state to thereby reduce the overall power consumption of the communication device 100. Advantageously, this broadband scan can identify strong signals without narrowband tuning. The resulting signal metric values (signal information) can be stored in memory 292 (and/or in memory 255 and/or memory 215).

After operation 401, the flowchart 400 transitions to operation 403, where a selection between a first operating mode (e.g. strong signal case) and a second beamforming operating mode (e.g. weak signal case) is performed. The selection can be based on the determined signal information. This selection can be based on whether the determine signal information indicates a strong or weak signal case. In an exemplary aspect, the signal metric values (e.g. SNR) can be compared to a signal metric threshold value (e.g. $SNR_{MIN}$). Based on this comparison, the operating mode can be determined. For example, it is determined whether the broadband scan produced any strong signals above a predefined threshold value (e.g. $SNR_{MIN}$). If the YES, the flowchart 400 transitions to operation 404. Otherwise, the flowchart transitions to operation 405.

In operation 404, one or more second signal metric measurements for a subset of beamforming configurations of the wireless communication device are performed to determine beamforming information. In operation 404, beamforming scanning operations are performed by the RFFE 260 and transceiver 230 in cooperation. In this example, strong signals identified by the RFFE 260 are further analyzed. In an exemplary aspect, AWV/Fc/BW combinations that have been identified as a strong signal (e.g. those AWV/Fc/BW combinations where the Wideband SNR≥$SNR_{MIN}$) are scanned to determine RF carriers. The results of the scan (e.g. beamforming information) can then be provided to the BBIC 205 (operation 407). In an exemplary aspect, the transceiver 230 is configured to down mix the RF signals to baseband, and to filter and generate digital data from the baseband signal. In an exemplary aspect, the second signal metric measurements are performed at a lower bandwidth than the first signal metric measurements performed during the RFFE-only scan in operation 401.

In an exemplary aspect, the transceiver 230 is configured to perform one or more FFT operations to determine the spectral content of the acquired baseband signal, which can reduce the number of iterations of carrier frequency (Fc) and receiver bandwidth (BW).

In an exemplary aspect, the signal metric values (signal information) determined in operation 401 and stored in memory 292 are used to "pre-seed" the search (e.g. search constraints on Fc, BW) based on previously acquired carrier frequencies and BWs, or those expected form a neighbor cell advertisement list which may be broadcast by the base station. In an exemplary aspect, system time sync info can be obtained, if available, from the BBIC 205 at the start of the scan, such that the SSB signal blocks can be listened for only at the times of their broadcast schedule.

In an exemplary aspect, the flowchart 400 may bypass operation 404 and proceed directly to operation 407. In this example, the BBIC 205 can be configured to attempt to sync to a strongest signals (using the BBIC 205, XCVR 230, and RFFE 260). In an exemplary aspect, this bypass is used in an initial system discovery phase where the strongest signal would be preferred as a starting point, but the bypass is not limited to the initial discovery phase and can be used in other phases. In these examples, the BBIC 205 can be configured to learn the results of the RFFE-only scan, either using the transceiver 230 to read out the RFFE scan results, or having the BBIC 205 read the results directly from the RFFE 260.

At operation 405, one or more third signal metric measurements are performed on the beamforming configurations (e.g. similar operations that are performed to determine the second signal metric measurements, but performed for all of the beamforming configurations) of the wireless communication to determine the beamforming information. In an exemplary aspect, operation 405 is performed when the RFFE-only scan in operation 401 does not identify any strong signal candidates. In an exemplary aspect, all (or more than those scanned in operation 404) AWV/Fc/BW combinations are scanned to determine RF carriers. In this example, similar to operation 404, beamforming scanning operations are performed by the RFFE, 260 and transceiver 230 in cooperation, but more (e.g. all) of the AWV/Fc/BW combinations are scanned to determine RF carriers. In this example, because no (or only a limited number of) strong signals are identified by RFFE-only scan by the RFFE 260 in operation 401, more (e.g. all) of the AWV/Fc/BW combinations are scanned and further analyzed. In an exemplary aspect, the signal metric values (signal information) determined in operation 401 and stored in memory 292 are used to pre-seed the search as discussed above.

In an exemplary aspect, the third signal metric measurements are performed at a lower bandwidth than the first signal metric measurements performed during the RFFE-only scan in operation 401. The third signal metric measurements can be performed at a higher bandwidth, a lower bandwidth, or a same bandwidth as the second signal metric measurements performed in operation 404.

After operation 405, the flowchart 400 transitions to operation 406, where the beamforming information determined in operation 405 is analyzed to determine if the scan of the AWV/Fc/BW combinations in operation 405 has identified RF carrier candidates. In an exemplary aspect, the analysis includes the determination of whether the beamforming information determined in operation 405 identifies any strong RF carriers. In an exemplary aspect, the beamforming information (e.g. SNR of the AWV/Fc/BW combinations) is compared to a signal metric threshold value (e.g. $SNR_{MIN}$). If the comparison indicates one or more of the combinations exceeds (or is equal to) the threshold, the flowchart 400 transitions to operation 407. Otherwise, the flowchart transitions to operation 409.

In an exemplary aspect, in operation 404 and/or operation 405, SNR ratios on the order of 0 dB (e.g. at the detector) can be discriminated, which is more sensitive than the RFFE-only scan by the RFFE 260. In an exemplary aspect, the detector is a power detector that is configured for digital power detection of a band-limited signal.

After operation 404 (or after operation 406 if operation 406 is determined in the affirmative), the flowchart 400 transitions to operation 407, where one or more synchronization signal blocks (SSBs) are decoded based on the beamforming information (e.g. results of the scan in operation 404 or results of scan in operation 405). In an exemplary aspect, the BBIC 205 is configured to decode the one or more SSBs based on the beamforming information. In this example, the results of the scan (e.g. beamforming information) are provided to the BBIC 205 from the transceiver 230 and/or RFFE, 260.

The results can be stored in the memory 215. Alternatively or additionally, the results can be stored in memory 255 and/or memory 292, and the BBIC 205 is configured to access the stored results.

In an exemplary aspect, the BBIC 205 analyzes and demodulates the signals acquired in operation 404 and/or operation 405. The BBIC 205 can decode the acquired signals and acquires synchronization using the PSS and SSS synchronization signals.

In an exemplary aspect, the system broadcast represented by the Physical Broadcast Channel (PBCH) can also be decoded by the BBIC 205 to determine if the signal acquired belongs to an operator for which the communication device 100 (i.e. UE) is potentially authorized to attach to.

After operation 407, the flowchart 400 transitions to operation 408, where it is determined if a valid operator signal has been identified. In an exemplary aspect, the determination can include whether one or more SSBs have been successfully decoded and/or synchronization has been acquired. In an exemplary aspect, the BBIC 205 is configured to determine if a valid operator signal has been identified.

If a valid operator signal has been identified (YES at operation 408), the flowchart transitions to operation 410 where the scanning method ends.

Otherwise (NO at operation 408), the flowchart transitions to operation 409, where a system re-scan procedure is performed. In an exemplary aspect, a re-scan procedure can include a back-off timer may be used before attempting to re-scan the environment. In an exemplary aspect, in the re-scan procedure 409, the BBIC 205 may be used for all AWV/Fc/BW combinations for increased (e.g. best) sensitivity. In this example, the re-scan procedure 409 incurs an increased (e.g. highest) power consumption.

In an exemplary aspect, the re-scan procedure includes the flowchart 400 being repeated. The repetition of the flowchart 400 can be performed after expiration of the back-off timer in one or more aspects, but is not required.

If operation 406 results in a negative (NO at operation 406), the flowchart 400 also transitions to operation 409.

Figure 5:
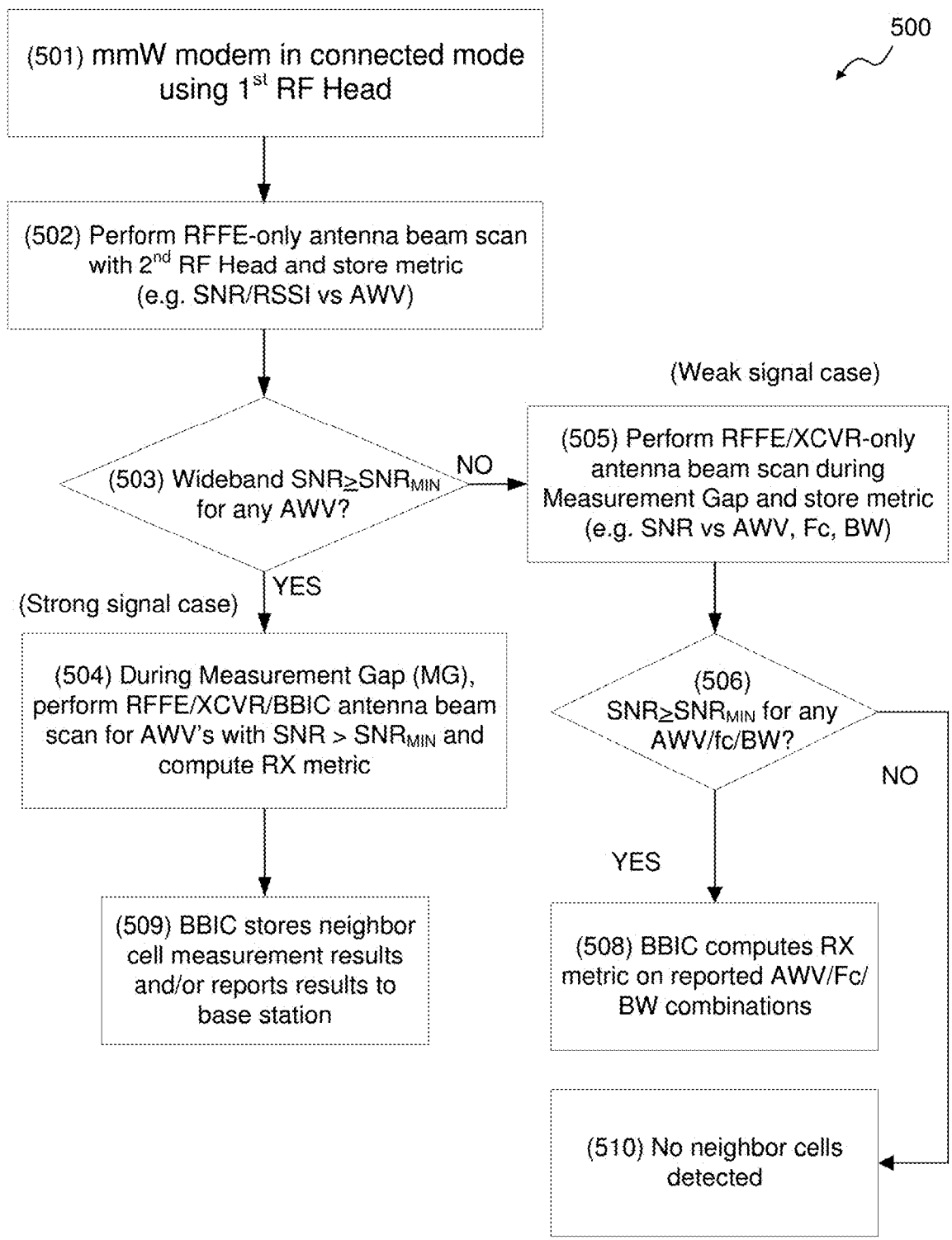
FIG. 5 illustrates a scanning method according to an exemplary aspect of the present disclosure.

FIG. 5 illustrates a flowchart of scanning method 500 according to an exemplary aspect of the present disclosure is illustrated. The flowchart is described with continued reference to FIGS. 1-4. The operations of the method are not limited to the order described below, and the various operations may be performed in a different order. Further, two or more operations of the method may be performed simultaneously with each other. The scanning method 500 can be performed in aspects where the communication device 100 includes two or more RFFEs 260. In these aspects, the RFFEs 260 can share a common transceiver 230 and/or BBIC 205. Alternatively, the communication device 100 (i.e. communication circuit 170) can include multiple RFFEs 260, each having a dedicated transceiver 230 and BBIC 205. In another aspect, the communication device 100 can include multiple communication circuits 170, each with at least one RFFE 260. The communication device 100 can include a single antenna array 295 shared by the multiple RFFEs 260, or can have multiple antenna arrays for each corresponding RFFE 260.

The method illustrated in flowchart 500 uses a second RFFE, 260 to perform a neighbor scan using the second RFFE 260, while actively receiving and/or transmitting on the first RFFE 260. In these aspects, the detector 285 (e.g. power detector) of the second RFFE 260 is configured to identify beams with strong energy while active reception/transmission continues using the first RFFE 260 and transceiver 230. In this example, beams can be identified and pre-selected prior to measurement gaps. During measurement gaps, the band limited power detection in the transceiver 230 is used to measure the beams identified as having strong signal power. The BBIC 205 may also be engaged at this stage to compute a more complex receive signal metric such as, for example, a Reference Symbol Received power (RSRP). In an exemplary aspect, the BBIC 205 (e.g. BB circuitry 220) does not decode until the strongest beam candidate(s) are identified. Advantageously, fewer beams are decoded and beam identification and acquisition occurs faster and with less power due to the BBIC 205 (e.g. BB circuitry 220) being inactive for an increased duration.

In an exemplary aspect, the second RFFE 260 (possibly located in a different position in the communication device 100 than the first RFFE 260), is used to scan autonomously for neighbor cells when the first RFFE 260, the transceiver 230, and BBIC 205 are receiving data from or sending data to the base station.

The method of method 500 begins at operation 501, where the communication device 100 is connected in an active mode where the first RFFE 260, transceiver 230 and BBIC 205 are receiving data from or sending data to the base station.

After operation 501 (i.e. while the communication device 100 operates in a connected mode using a first RFFE 260, with user data being exchanged between the communication device 100 and the base station 105, AP 107, and/or other user device 109), the flowchart transitions to operation 502 where one or more first signal metric measurements are performed by the second RFFE 260 to determine signal information. In an exemplary aspect, the second RFFE 260 autonomously searches through various antenna beam angles by adjusting different phase shifter data values and LNA gain values (e.g. AWVs). The detector 285 detects a signal metric values (e.g. signal information) for each of the different phase and/or gain settings. In an exemplary aspect, the processor circuitry 290 of the second RFFE 260 is configured to adjust (or control the respective components to adjust) the phase and/or gain settings, and to determine the signal metric values based on the various settings.

In an exemplary aspect, the second RFFE 260 performs the signal metric measurements without involvement (or with only limited involvement) of the transceiver 230 and BBIC 205 associated with the first RFFE 230 (and/or without a second transceiver 230 and second BBIC 205 in aspects where the second RFFE 260 has a separate transceiver and BBIC). Advantageously, this broadband scan can identify strong signals without narrowband tuning. The resulting signal metric values (signal information) can be stored in memory 292 (and/or in memory 255 and/or memory 215).

After operation 502, the flowchart 500 transitions to operation 503, where a selection between a first operating mode (e.g. strong signal case) and a second beamforming operating mode (e.g. weak signal case) is performed. The selection can be based on the determined signal information. This selection can be based on whether the determine signal information indicates a strong or weak signal case. In an exemplary aspect, the signal metric values (e.g. SNR) can be compared to a signal metric threshold value (e.g. $SNR_{MIN}$). Based on this comparison, the operating mode can be determined. For example, it is determined whether the broadband scan produced any strong signals above a pre-defined threshold value (e.g. $SNR_{MIN}$). If the YES, the flowchart 500 transitions to operation 504 (strong signal case). Otherwise, the flowchart transitions to operation 505 (weak signal case).

In operation 504, one or more second signal metric measurements for a subset of beamforming configurations of the wireless communication device are performed to determine beamforming information. In an exemplary aspect, the second signal metric measurement(s) are performed during the measurement gap (MG). In operation 504, beamforming scanning operations are performed by the second RFFE 260 and transceiver 230 in cooperation. In this example, the transceiver 230 associated with the active connection using the first RFFE 260 can switch to be used by the second RFFE 260 during operation 504 because the second signal metric measurements are performed during the measurement gap.

Strong signals (e.g. of neighboring cells) identified by the second RFFE 260 are further analyzed. In an exemplary aspect, AWV/Fc/BW combinations that have been identified as a strong signal (e.g. those AWV/Fc/BW combinations where the Wideband $SNR \geq SNR_{MIN}$) are scanned to determine RF carriers. The results of the scan (e.g. beamforming information) can then be provided to the BBIC 205 (operation 509) and the BBIC 205 can store the measurements (e.g. measurements corresponding to neighbor cells), and/or the results can be reported to the base station 105.

At operation 505, one or more third signal metric measurements are performed on the beamforming configurations (e.g. all of the beamforming configurations) of the wireless communication to determine the beamforming information. In an exemplary aspect, the third signal metric measurement(s) are performed during the measurement gap (MG).

Operation 505 is performed during the measurement gap when the RFFE-only scan in operation 501 does not identify any strong signal candidates. In an exemplary aspect, all (or more than those scanned in operation 504) AWV/Fc/BW combinations are scanned to determine RF carriers. In this example, similar to operation 404, beamforming scanning operations are performed by the RFFE 260 and transceiver 230 in cooperation, but more (e.g. all) of the AWV/Fc/BW combinations are scanned to determine RF carriers.

In this example, because no (or only a limited number of) strong signals are identified by RFFE-only scan by the RFFE 260 in operation 501, more (e.g. all) of the AWV/Fc/BW combinations are scanned and further analyzed.

After operation 505, the flowchart 500 transitions to operation 506, where the beamforming information determined in operation 505 is analyzed to determine if the scan of the AWV/Fc/BW combinations in operation 505 has identified RF carrier candidates. In an exemplary aspect, the analysis includes the determination of whether the beamforming information determined in operation 505 identifies any strong RF carriers. In an exemplary aspect, the beamforming information (e.g. SNR of the AWV/Fc/BW combinations) is compared to a signal metric threshold value (e.g. $SNR_{MIN}$). If the comparison indicates one or more of the combinations exceeds (or is equal to) the threshold, the flowchart 500 transitions to operation 508. Otherwise, the flowchart transitions to operation 510.

At operation 508, the BBIC 205 computes one or more receive metrics based on the reported AWV/Fc/BW combinations. In an exemplary aspect, receive metric includes RSRP. The receive metric(s) can be stored in the memory 215. Alternatively or additionally, the receive metric(s) can be stored in memory 255 and/or memory 292, and the BBIC 205 is configured to access the stored results. The receive metric(s) of the scan additionally or alternatively be reported to the base station.

At operation 510, no neighbor cells are detected (e.g. no cells with suitable candidates) and the flowchart 500 ends.

Figure 6:
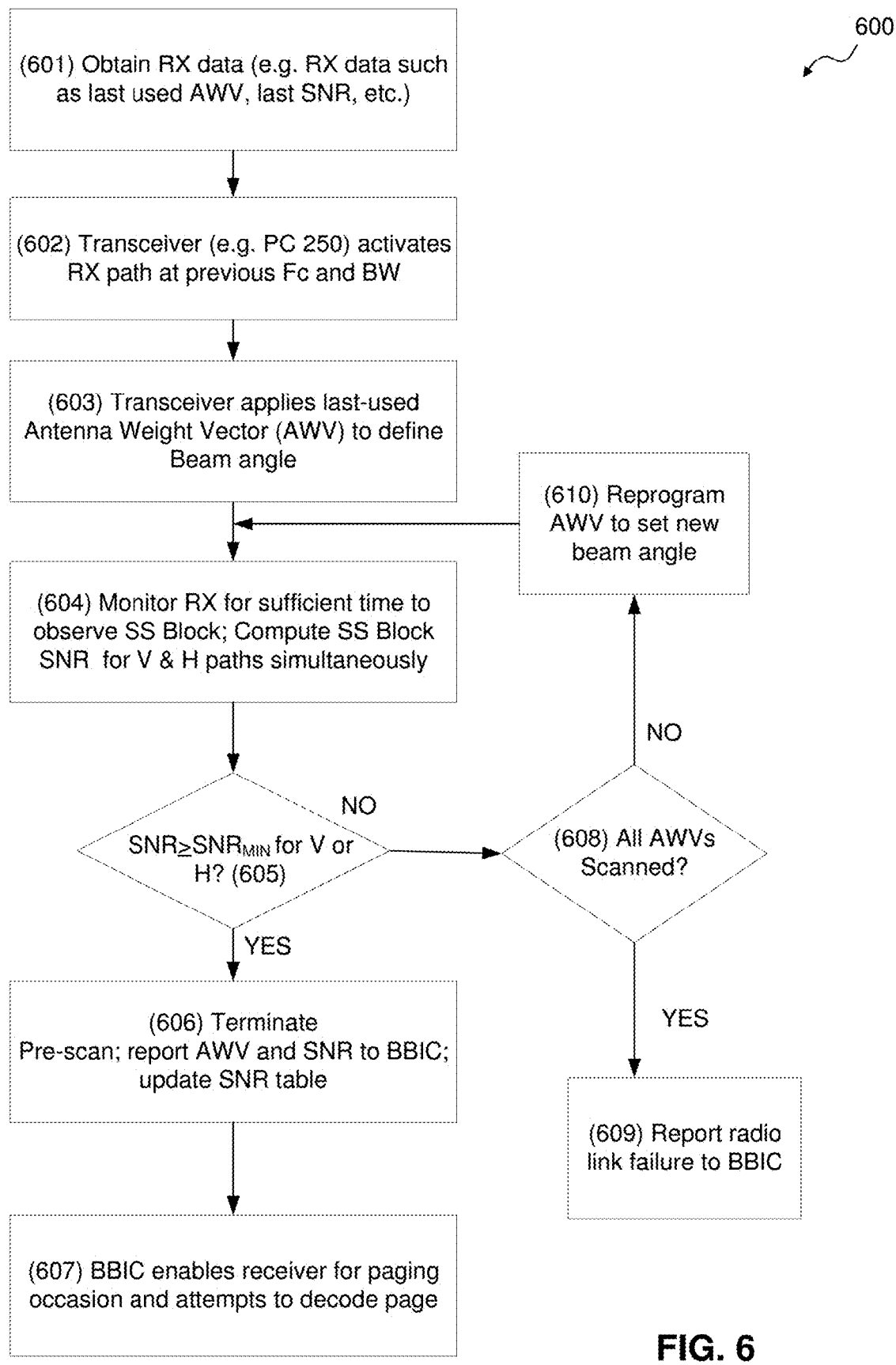
FIG. 6 illustrates an idle scanning method according to an exemplary aspect of the present disclosure.

FIG. 6 illustrates a flowchart of scanning method 600 according to an exemplary aspect of the present disclosure is illustrated. The flowchart is described with continued reference to FIGS. 1-5. The operations of the method are not limited to the order described below, and the various operations may be performed in a different order. Further, two or more operations of the method may be performed simultaneously with each other. In an exemplary aspect, the scanning method 600 is performed during an idle mode of the communication circuit 170.

In an exemplary aspect, the method includes the performance of a beam pre-check during idle mode, but before the paging occasion in which the BBIC 205 is active. In this form, the beam search can be pre-seeded using the previously used beam angle as a starting point. Further, in an exemplary aspect, in the RFFE-transceiver portion of the search, only the Fc and BW of the active serving cell are used.

For the idle mode, it is only necessary to establish sufficient SNR or RSSI to decode the PDCCH, which uses QPSK modulation, rather than find the strongest signal.

In an exemplary aspect, the idle mode scanning includes:
Waking up the receiver by a pre-determined lead time amount, which is a function of the Synchronization block periodicity.
Start search with last used beam angle (AWV), carrier frequency (Fc), and bandwidth (BW).
Determine if SNR is sufficient to reliably decode PDCCH which utilizes low order modulation, such as QPSK. Adjust AWV (beam angle) if needed.
Iterate through all AWVs until sufficient SNR is found.
Stop search when sufficient SNR found, and report SNR and beam angle used to BBIC
BBIC then waits until actual paging occasion and decodes paging data to determine if there is a page (indicator of actual UE data) for that UE.

The method of method 600 begins at operation 601, where receive (RX) data (e.g. RX data such as last used AWV, last SNR, etc.) is obtained. For example, the RX data can be retrieved from memory (e.g. memory 292 and/or memory 255)

After operation 601, the flowchart transitions to operation 602, where the transceiver 230 (e.g. processor circuitry 250) activates the receiver 240 at the previous Fc and BW.

After operation 602, the flowchart transitions to operation 603, where the transceiver 230 applies the last-used Antenna Weight Vector (AWV) to define the beam angle.

After operation 603, the flowchart transitions to operation 604, where received signals by the receiver 240 are monitored for sufficient time to observe synchronization signal (SS) blocks. The SNR for the SS block is then determined/computed for vertical and horizontal polarization antenna paths. The computation for the vertical and horizontal paths can be simultaneous in an aspect.

After operation 604, the flowchart transitions to operation 605, where the determined SNR is compared with a SNR threshold value (e.g. minimum SNR value). If the SNR exceeds the SNR threshold value (YES), the flowchart transitions to operation 606. Otherwise, the flowchart transitions to operation 608.

At operation 606, the idle scan in terminated and the AWV and SNR value are reported to the BBIC 205. In an aspect, a table SNR values can be updated with the SNR value.

After operation 606, the flowchart transitions to operation 607, where the BBIC 205 enables the transceiver 230 (e.g. receiver 240) to receive a paging occasion and attempts to decode the received page. The flowchart then ends.

At operation 608, it is determined if all AWV have been scanned. If NO, the flowchart 600 transitions to operation 610, where a new AWV is set to set a new beam angle. The flowchart then transitions back to operation 604, where operation 604 is repeated with the new AWV.

If all AWV have been scanned, the transceiver 230 reports to the BBIC 205 that there has been a radio link failure and the flowchart ends.

EXAMPLES

Example 1 is a beamforming scanning method for an antenna array of a wireless communication device, the method comprising: performing one or more first signal metric measurements to determine signal information; selecting between a first operating mode and a second operating mode based on the determined signal information; in the first operating mode, performing one or more second signal metric measurements for a subset of beamforming configurations of the wireless communication device to determine beamforming information; and in the second operating mode, performing one or more third signal metric measurements on the beamforming configurations of the wireless communication to determine the beamforming information.

Example 2 is the subject matter of Example 1, further comprising: decoding one or more synchronization signal blocks (SSBs) based on the beamforming information.

Example 3 is the subject matter of any of Examples 1-2, further comprising: comparing the beamforming information determined in the second operating mode to a threshold value; and selectively performing, based on the comparison: (1) a decoding of one or more synchronization signal blocks (SSBs) based on the beamforming information determined in the second beaming forming operating mode, and (2) one or more rescanning operations.

Example 4 is the subject matter of any of Examples 1-3, wherein selecting between the first operating mode and the second operating mode comprises: comparing the signal information to a threshold value, wherein the first operating mode is selected if the signal information is less than the threshold value, and the second operating mode is selected if the signal information is greater than the threshold value.

Example 5 is the subject matter of any of Examples 1-4, wherein the signal information comprises signal strength information with respect to one or more corresponding antenna weight vectors.

Example 6 is the subject matter of any of Examples 1-5, wherein the signal strength information comprises one or more signal-to-noise ratios (SNRs) or received signal strength indications (RSSIs).

Example 7 is the subject matter of Example 5, wherein the antenna weight vectors each comprise one or more phase shifting parameters, one or more delay parameters, and/or one or more gain parameters associated with a corresponding antenna of the antenna array.

Example 8 is the subject matter of any of Examples 1-7, wherein the performing the one or more first signal metric measurements uses a radio frequency frontend (RFFE) of the wireless communication device and the performing the one or more second signal metric measurements and/or one or more third signal metric measurements uses the RFFE and a transceiver of the wireless communication device.

Example 9 is the subject matter of any of Examples 2-7, wherein the performing the one or more first signal metric measurements uses a radio frequency frontend (RFFE) of the wireless communication device, the performing the one or more second signal metric measurements and/or one or more third signal metric measurements uses the RFFE and a transceiver of the wireless communication device, and the decoding the one or more SSBs uses the RFFE, the transceiver, and a baseband processor of the wireless communication device.

Example 10 is the subject matter of any of Examples 1-9, wherein the performing the one or more first signal metric measurements to determine the signal information is independent of a measurement gap.

Example 11 is the subject matter of any of Examples 1-10, wherein the performing the one or more second signal metric measurements to determine the beamforming information is independent of a measurement gap and/or the performing the one or more third signal metric measurements to determine the beamforming information is independent of a measurement gap.

Example 12 is the subject matter of any of Examples 1-11, wherein the performing the one or more first signal metric measurements uses a second radio frequency frontend (RFFE) of the wireless communication device while a first RFFE of the wireless communication device is communicating with a base station.

Example 13 is the subject matter of any of Examples 1-12, wherein a number of the beamforming configurations in which the one or more third signal metric measurements are performed is greater than the subset of the beamforming configurations in which the one or more second signal metric measurements are performed.

Example 14 is the subject matter of any of Examples 1-13, wherein performing the one or more third signal metric measurements comprises performing the one or more third signal metric measurements on each of the beamforming configurations.

Example 15 is the subject matter of any of Examples 1-14, wherein the one or more first signal metric measurements are performed at a first bandwidth, and the one or more second signal metric measurements and/or the one or more third signal metrics are performed at a second bandwidth less than the first bandwidth.

Example 16 is the subject matter of any of Examples 1-15, wherein the one or more first signal metric measurements, the one or more second signal metric measurements, and/or the one or more third signal metric measurements comprise one or more power detection measurements.

Example 17 is the subject matter of any of Examples 1-4 and 8-16, wherein the beamforming information comprises signal strength information with respect to one or more corresponding antenna weight vectors.

Example 18 is the subject matter of any of Examples 1-5 and 7-17, wherein the signal strength information comprises one or more signal-to-noise ratios (SNRs) or received signal strength indications (RSSIs).

Example 19 is the subject matter of any of Examples 1-6 and 8-18, wherein the antenna weight vectors each comprise one or more phase shifting parameters, one or more delay parameters, and/or one or more gain parameters associated with a corresponding antenna of the antenna array.

Example 20 is a wireless communication device operable to perform a beamforming scanning operation with an antenna array, the wireless communication device comprising: a transceiver; a radio frequency frontend (RFFE) coupled to the transceiver and to the antenna array, and configured to perform one or more first signal metric measurements to determine signal information; and a processor configured to: select between a first operating mode and a second operating mode based on the determined signal information; in the first operating mode, control the transceiver to perform one or more second signal metric measurements for a subset of beamforming configurations of the wireless communication device to determine beamforming information; and in the second operating mode, control the transceiver to perform one or more third signal metric measurements on the beamforming configurations of the wireless communication to determine the beamforming information.

Example 21 is the subject matter of Example 20, further comprising a baseband circuit coupled to the transceiver, and that is configured to decode one or more synchronization signal blocks (SSBs) based on the beamforming information.

Example 22 is the subject matter of any of Examples 20-21, wherein the processor is further configured to: compare the beamforming information determined in the second operating mode to a threshold value; and selectively control, based on the comparison: (1) a baseband circuit of the wireless communication device to decode one or more synchronization signal blocks (SSBs) based on the beamforming information determined in the second operating mode, and (2) the baseband circuit, the transceiver, and the RFFE to cooperatively perform one or more rescanning operations.

Example 23 is the subject matter of any of Examples 20-22, wherein selecting between the first operating mode and the second operating mode comprises: comparing the signal information to a threshold value, wherein the first operating mode is selected if the signal information is less than the threshold value, and the second operating mode is selected if the signal information is greater than the threshold value.

Example 24 is the subject matter of any of Examples 20-23, wherein the signal information comprises signal strength information with respect to one or more corresponding antenna weight vectors.

Example 25 is the subject matter of any of Examples 20-24, wherein the signal strength information comprises one or more signal-to-noise ratios (SNRs) or received signal strength indications (RSSIs).

Example 26 is the subject matter of Example 24, wherein the antenna weight vectors each comprise one or more phase shifting parameters, one or more delay parameters, and/or one or more gain parameters associated with a corresponding antenna of the antenna array.

Example 27 is the subject matter of any of Examples 20-26, wherein the performing the one or more first signal metric measurements to determine the signal information is independent of a measurement gap.

Example 28 is the subject matter of any of Examples 20-27, wherein the performing the one or more second signal metric measurements to determine the beamforming information is independent of a measurement gap and/or the performing the one or more third signal metric measurements to determine the beamforming information is independent of a measurement gap.

Example 29 is the subject matter of any of Examples 20-28, further comprising a second RFFE, wherein the one or more power detection measurements are performed by the RFFE while the second RFFE of the wireless communication device is communicating with a base station.

Example 30 is the subject matter of Example 29, wherein the RFFE, and the second RFFE share the transceiver.

Example 31 is the subject matter of any of Examples 20-30, wherein a number of the beamforming configurations in which the one or more third signal metric measurements are performed is greater than the subset of the beamforming configurations in which the one or more second signal metric measurements are performed.

Example 32 is the subject matter of any of Examples 20-31, wherein performing the one or more third signal metric measurements comprises performing the one or more third signal metric measurements on each of the beamforming configurations.

Example 33 is the subject matter of any of Examples 20-32, wherein the one or more first signal metric measurements are performed at a first bandwidth, and the one or more second signal metric measurements and/or the one or more third signal metrics are performed at a second bandwidth less than the first bandwidth.

Example 34 is the subject matter of any of Examples 20-33, wherein the one or more first signal metric measurements, the one or more second signal metric measurements, and/or the one or more third signal metric measurements comprise one or more power detection measurements.

Example 35 is the subject matter of any of Examples 20-23 and 27-34, wherein the beamforming information comprises signal strength information with respect to one or more corresponding antenna weight vectors.

Example 36 is the subject matter of Example 35, wherein the signal strength information comprises one or more signal-to-noise ratios (SNRs) or received signal strength indications (RSSIs).

Example 37 is the subject matter of any of Examples 35-36, wherein the antenna weight vectors each comprise one or more phase shifting parameters, one or more delay parameters, and/or one or more gain parameters associated with a corresponding antenna of the antenna array.

Example 38 is a wireless communication device operable to perform a beamforming scanning operation with an antenna array, the wireless communication device comprising: transceiving means; radio frequency processing means (RFP) means coupled to the transceiving means and to the antenna array, and for performing one or more first signal metric measurements to determine signal information; and processing means for: selecting between a first operating mode and a second operating mode based on the determined signal information; in the first operating mode, controlling the transceiving means to perform one or more second signal metric measurements for a subset of beamforming configurations of the wireless communication device to determine beamforming information; and in the second operating mode, controlling the transceiving means to perform one or more third signal metric measurements on the beamforming configurations of the wireless communication to determine the beamforming information.

Example 39 is the subject matter of Example 38, further comprising baseband processing means coupled to the transceiving means, and for decoding one or more synchronization signal blocks (SSBs) based on the beamforming information.

Example 40 is the subject matter of any of Examples 38-39, wherein the processing means is further configured to: compare the beamforming information determined in the second operating mode to a threshold value; and selectively control, based on the comparison: (1) baseband processing means of the wireless communication device to decode one or more synchronization signal blocks (SSBs) based on the beamforming information determined in the second operating mode, and (2) the baseband processing means, the transceiving means, and the RFP means to cooperatively perform one or more rescanning operations.

Example 41 is the subject matter of any of Examples 38-40, wherein selecting between the first operating mode and the second operating mode comprises: comparing the signal information to a threshold value, wherein the first operating mode is selected if the signal information is less than the threshold value, and the second operating mode is selected if the signal information is greater than the threshold value.

Example 42 is the subject matter of any of Examples 38-41, wherein the signal information comprises signal strength information with respect to one or more corresponding antenna weight vectors.

Example 43 is the subject matter of any of Examples 38-42, wherein the signal strength information comprises one or more signal-to-noise ratios (SNRs) or received signal strength indications (RSSIs).

Example 44 is the subject matter of Example 42, wherein the antenna weight vectors each comprise one or more phase shifting parameters, one or more delay parameters, and/or one or more gain parameters associated with a corresponding antenna of the antenna array.

Example 45 is the subject matter of any of Examples 38-44, wherein the performing the one or more first signal metric measurements to determine the signal information is independent of a measurement gap.

Example 46 is the subject matter of any of Examples 38-45, wherein the performing the one or more second signal metric measurements to determine the beamforming information is independent of a measurement gap and/or the performing the one or more third signal metric measurements to determine the beamforming information is independent of a measurement gap.

Example 47 is the subject matter of any of Examples 38-46, further comprising a second RFP means, wherein the one or more power detection measurements are performed by the RFP means while the second RFP means of the wireless communication device is communicating with a base station.

Example 48 is the subject matter of Example 47, wherein the RFP means and the second RFP means share the transceiving means.

Example 49 is the subject matter of any of Examples 38-48, wherein a number of the beamforming configurations in which the one or more third signal metric measurements are performed is greater than the subset of the beamforming configurations in which the one or more second signal metric measurements are performed.

Example 50 is the subject matter of any of Examples 38-49, wherein performing the one or more third signal metric measurements comprises performing the one or more third signal metric measurements on each of the beamforming configurations.

Example 51 is the subject matter of any of Examples 38-50, wherein the one or more first signal metric measurements are performed at a first bandwidth, and the one or more second signal metric measurements and/or the one or more third signal metrics are performed at a second bandwidth less than the first bandwidth.

Example 52 is the subject matter of any of Examples 38-51, wherein the one or more first signal metric measurements, the one or more second signal metric measurements, and/or the one or more third signal metric measurements comprise one or more power detection measurements.

Example 53 is the subject matter of any of Examples 38-41 and 45-52, wherein the beamforming information comprises signal strength information with respect to one or more corresponding antenna weight vectors.

Example 54 is the subject matter of Example 53, wherein the signal strength information comprises one or more signal-to-noise ratios (SNRs) or received signal strength indications (RSSIs).

Example 55 is the subject matter of any of Examples 53-54, wherein the antenna weight vectors each comprise one or more phase shifting parameters, one or more delay parameters, and/or one or more gain parameters associated with a corresponding antenna of the antenna array.

Example 56 is a non-transitory computer-readable storage medium with an executable program stored thereon, when executed, causes a processor to perform the operations of any of Examples 1-19.

Example 57 is an apparatus comprising means to perform the operations of any of Examples 1-19.

Example 58 is an apparatus substantially as shown and described.

Example 59 is a method substantially as shown and described.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to communication protocols that utilize the millimeter wave (mmWave) spectrum (e.g., 24 GHz-300 GHz), such as WiGig (IEEE 802.11ad and/or IEEE 802.11ay) which operates at 60 GHz, and/or one or more 3GPP NR (New Radio) protocols using, for example, the 28 GHz frequency spectrum. The exemplary aspects can be applied to other wireless communication protocols/standards (e.g., LTE or other cellular protocols, other IEEE 802.11 protocols, etc.) as would be understood by one of ordinary skill in the relevant arts.

What is claimed is:

1. A beamforming scanning method for an antenna array of a wireless communication device, the method comprising:
    performing one or more first signal metric measurements to determine signal information;
    selecting between a first operating mode and a second operating mode based on the determined signal information;
    in the first operating mode, performing one or more second signal metric measurements for a subset of beamforming configurations of the wireless communication device to determine beamforming information; and
    in the second operating mode, performing one or more third signal metric measurements on the beamforming configurations of the wireless communication to determine the beamforming information.

2. The method of claim 1, further comprising: decoding one or more synchronization signal blocks (SSBs) based on the beamforming information.

3. The method of claim 1, further comprising:
    comparing the beamforming information determined in the second operating mode to a threshold value; and
    selectively performing, based on the comparison: (1) a decoding of one or more synchronization signal blocks (SSBs) based on the beamforming information determined in the second beaming forming operating mode, and (2) one or more rescanning operations.

4. The method of claim 1, wherein selecting between the first operating mode and the second operating mode comprises:
    comparing the signal information to a threshold value, wherein the first operating mode is selected if the signal information is less than the threshold value, and the second operating mode is selected if the signal information is greater than the threshold value.

5. The method of claim 1, wherein the signal information comprises signal strength information with respect to one or more corresponding antenna weight vectors.

6. The method of claim 5, wherein the signal strength information comprises one or more signal-to-noise ratios (SNRs) or received signal strength indications (RSSIs).

7. The method of claim 5, wherein the antenna weight vectors each comprise one or more phase shifting parameters, one or more delay parameters, and/or one or more gain parameters associated with a corresponding antenna of the antenna array.

8. The method of claim 1, wherein the performing the one or more first signal metric measurements uses a radio frequency frontend (RFFE) of the wireless communication device and the performing the one or more second signal metric measurements and/or one or more third signal metric measurements uses the RFFE and a transceiver of the wireless communication device.

9. The method of claim 2, wherein the performing the one or more first signal metric measurements uses a radio frequency frontend (RFFE) of the wireless communication device, the performing the one or more second signal metric measurements and/or one or more third signal metric measurements uses the RFFE and a transceiver of the wireless communication device, and the decoding the one or more SSBs uses the RFFE, the transceiver, and a baseband processor of the wireless communication device.

10. The method of claim 1, wherein the performing the one or more first signal metric measurements to determine the signal information is independent of a measurement gap.

11. The method of claim 1, wherein the performing the one or more second signal metric measurements to determine the beamforming information is independent of a measurement gap and/or the performing the one or more third signal metric measurements to determine the beamforming information is independent of a measurement gap.

12. The method of claim 1, wherein the performing the one or more first signal metric measurements uses a second radio frequency frontend (RFFE) of the wireless communication device while a first RFFE of the wireless communication device is communicating with a base station.

13. The method of claim 1, wherein a number of the beamforming configurations in which the one or more third signal metric measurements are performed is greater than the subset of the beamforming configurations in which the one or more second signal metric measurements are performed.

14. The method of claim 1, wherein performing the one or more third signal metric measurements comprises performing the one or more third signal metric measurements on each of the beamforming configurations.

15. The method of claim 1, wherein the one or more first signal metric measurements are performed at a first bandwidth, and the one or more second signal metric measurements and/or the one or more third signal metrics are performed at a second bandwidth less than the first bandwidth.

16. The method of claim 1, wherein the one or more first signal metric measurements, the one or more second signal metric measurements, and/or the one or more third signal metric measurements comprise one or more power detection measurements.

17. The method of claim 1, wherein the beamforming information comprises signal strength information with respect to one or more corresponding antenna weight vectors.

18. The method of claim 17, wherein the signal strength information comprises one or more signal-to-noise ratios (SNRs) or received signal strength indications (RSSIs).

19. The method of claim 17, wherein the antenna weight vectors each comprise one or more phase shifting parameters, one or more delay parameters, and/or one or more gain parameters associated with a corresponding antenna of the antenna array.

20. A wireless communication device operable to perform a beamforming scanning operation with an antenna array, the wireless communication device comprising:
   a transceiver;
   a radio frequency frontend (RFFE) coupled to the transceiver and to the antenna array, and configured to perform one or more first signal metric measurements to determine signal information; and
   a processor configured to:
      select between a first operating mode and a second operating mode based on the determined signal information;
      in the first operating mode, control the transceiver to perform one or more second signal metric measurements for a subset of beamforming configurations of the wireless communication device to determine beamforming information; and
      in the second operating mode, control the transceiver to perform one or more third signal metric measurements on the beamforming configurations of the wireless communication to determine the beamforming information.

21. The wireless communication device of claim 20, further comprising a baseband circuit coupled to the transceiver, and that is configured to decode one or more synchronization signal blocks (SSBs) based on the beamforming information.

22. The wireless communication device of claim 20, wherein the processor is further configured to:
   compare the beamforming information determined in the second operating mode to a threshold value; and
   selectively control, based on the comparison: (1) a baseband circuit of the wireless communication device to decode one or more synchronization signal blocks (SSBs) based on the beamforming information determined in the second operating mode, and (2) the baseband circuit, the transceiver, and the RFFE to cooperatively perform one or more rescanning operations.

23. The wireless communication device of claim 20, wherein selecting between the first operating mode and the second operating mode comprises:
   comparing the signal information to a threshold value, wherein the first operating mode is selected if the signal information is less than the threshold value, and the second operating mode is selected if the signal information is greater than the threshold value.

24. The wireless communication device of claim 20, wherein the signal information comprises signal strength information with respect to one or more corresponding antenna weight vectors.

25. The wireless communication device of claim 24, wherein the signal strength information comprises one or more signal-to-noise ratios (SNRs) or received signal strength indications (RSSIs).

* * * * *